Figure 1:
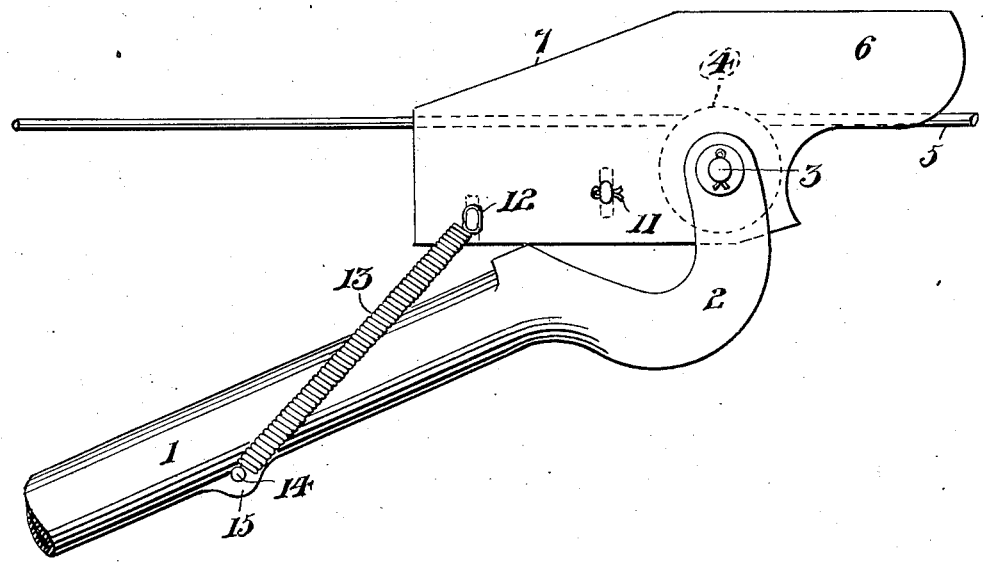

P. JOHNSON.
TROLLEY.
APPLICATION FILED MAY 1, 1913.

1,083,017.

MODEL.

Patented Dec. 30, 1913.

WITNESSES

INVENTOR
P. Johnson
By Henry C. Evert
ATTORNEY

COLUMBIA PLANOGRAPH CO., WASHINGTON, D. C.

UNITED STATES PATENT OFFICE.

PETER JOHNSON, OF HEATON, NEW MEXICO.

TROLLEY.

1,083,017.  Specification of Letters Patent.  Patented Dec. 30, 1913.

Application filed May 1, 1913.  Serial No. 764,920.  (Model.)

*To all whom it may concern:*

Be it known that I, PETER JOHNSON, a subject of the Czar of Russia, residing at Heaton, in the county of McKinley and State of New Mexico, have invented certain new and useful Improvements in Trolleys, of which the following is a specification, reference being had therein to the accompanying drawing.

This invention relates to trolleys, and the primary object of my invention is to furnish a trolley harp with novel spaced apart guards that are arranged to prevent accidental displacement of a trolley wheel relatively to a trolley wire, or other electric conductor, particularly when the wheel passes around a curved section of trolley wire or encounters irregularities in the same.

Another object of this invention is to provide a guard for trolley wheels that can be used in connection with the present type of trolley harp and without interfering with frogs, guard rails, hangers or other overhead fixtures.

A further object of this invention is to provide a trolley consisting of comparatively few parts that are inexpensive to manufacture, easy to assemble, durable and highly efficient for the purposes for which they are intended.

With the above and other objects in view the invention resides in the novel construction, combination and arrangement of parts to be hereinafter specifically described and then claimed.

Reference will now be had to the drawing, wherein:—

Figure 2:
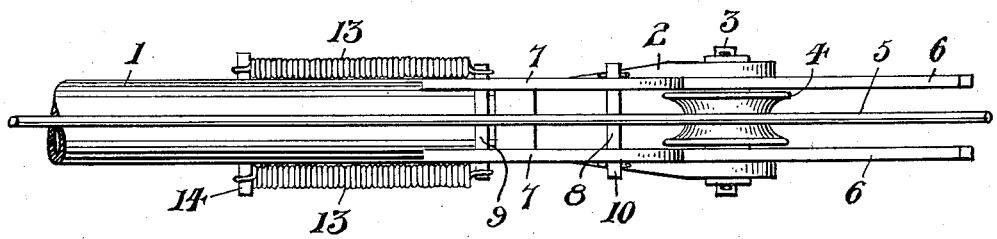

Figure 1 is a side elevation of a trolley in accordance with this invention, and Fig. 2 is a plan of the same.

Further describing the invention in detail with reference to the accompanying drawing, wherein like numerals denote corresponding parts throughout: 1 denotes a portion of a trolley pole having a harp 2 and revolubly mounted in said harp by a transverse journal pin 3 is a trolley wheel 4 adapted to travel against a trolley wire 5.

The reference numeral 6 denotes vertical parallel guard plates that are pivotally mounted upon the pin 3, between the arms of the harp 2 and the wheel 4. These plates have the forward ends thereof beveled, as at 7 whereby should they encounter overhead fixtures, said plates can readily ride under the same without injury to said fixtures. The plates 6 are spaced apart by rectangular blocks 8 and 9 having reduced oval ends 10 extending through said plates, the reduced oval ends of said blocks preventing the blocks from rotating between said plates. The reduced ends of the block 8 are provided with cotter pins 11 and connected to the reduced ends of the block 9 are the upper convolutions 12 of coiled springs 13, said springs having the lower convolutions thereof connected to a transverse pin 14 mounted in a web 15, carried by the underneath side of the pole 1. The guard plates 6 provide oppositely disposed parallel walls at the sides of the trolley wheel 4 and these walls are adapted to prevent the wire 5 from entirely leaving the harp. Should the wheel 4 become displaced the guard plates will retain the wire 5 in position whereby the wheel can readily ride into engagement with the same, and the springs 13 maintain the guard plates horizontal relatively to the wire 5 but permit of said plates assuming an angle should an obstruction be encountered.

One embodiment of the invention has been illustrated, but it is to be understood that the structural elements are susceptible to such variations and modifications as fall within the scope of the appended claim.

What I claim is:—

In a trolley, the combination with a pole having a harp, a journal pin and a trolley wheel, of vertical parallel guard plates pivotally mounted upon said journal pin at the sides of said wheel and within the harp, said guard plates having the forward ends thereof beveled, spacer blocks arranged between said guard plates and having reduced oval ends extending through said plates to prevent said blocks from rotating, one of the said blocks arranged forwardly of the other, cotter pins arranged in the ends of said rear block, and inclined coiled springs connected to the ends of the other of said blocks and to said pole for supporting said plates in a normally horizontal position.

In testimony whereof I affix my signature in the presence of two witnesses.

PETER JOHNSON.

Witnesses:
W. H. OWEN,
B. R. PERDUE.

Copies of this patent may be obtained for five cents each, by addressing the "Commissioner of Patents, Washington, D. C."